United States Patent
Sonawane et al.

(10) Patent No.: US 12,124,474 B2
(45) Date of Patent: Oct. 22, 2024

(54) REAL-TIME MASKING IN A STANDBY DATABASE

(71) Applicant: ORACLE INTERNATIONAL CORPORATION, Redwood Shores, CA (US)

(72) Inventors: Sachin Sonawane, Foster City, CA (US); Mahesh Girkar, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 279 days.

(21) Appl. No.: 16/163,171

(22) Filed: Oct. 17, 2018

(65) Prior Publication Data

US 2020/0125667 A1    Apr. 23, 2020

(51) Int. Cl.
*G06F 16/27* (2019.01)
*G06F 16/23* (2019.01)

(52) U.S. Cl.
CPC .......... *G06F 16/27* (2019.01); *G06F 16/2358* (2019.01)

(58) Field of Classification Search
CPC ...... G06F 16/27; G06F 16/2358; G06F 16/10; G06F 16/13; H04L 67/1095
USPC ........................................................ 707/625
See application file for complete search history.

(56) References Cited

U.S. PATENT DOCUMENTS

| | | | |
|---|---|---|---|
| 6,980,988 B1 | 12/2005 | Demers et al. | |
| 8,930,381 B2* | 1/2015 | Raghunathan | G06F 21/6254 707/756 |
| 2009/0100527 A1* | 4/2009 | Booth | G06F 21/6245 726/27 |
| 2010/0030795 A1* | 2/2010 | Pattabhi | G06F 21/6227 707/757 |
| 2011/0113050 A1* | 5/2011 | Youn | G06F 21/6218 707/757 |
| 2012/0259877 A1* | 10/2012 | Raghunathan | G06F 21/6254 707/757 |
| 2013/0144901 A1* | 6/2013 | Ho | G06F 16/2456 707/769 |
| 2013/0282697 A1* | 10/2013 | Barbas | G06F 16/24553 707/722 |
| 2014/0019467 A1* | 1/2014 | Itoh | G06F 21/6227 707/757 |
| 2014/0164405 A1* | 6/2014 | Tsai | G06F 21/6227 707/754 |
| 2016/0092535 A1* | 3/2016 | Kuchibhotla | G06F 16/27 707/634 |
| 2016/0224797 A1* | 8/2016 | Schrock | G06F 16/2291 |
| 2017/0116321 A1 | 4/2017 | Jain et al. | |
| 2017/0221154 A1* | 8/2017 | Eftekhari | G06Q 40/123 |
| 2017/0323119 A1* | 11/2017 | Harp | G06F 3/065 |

(Continued)

OTHER PUBLICATIONS

IBM Spectrum Copy Data Management™ 2.2.7.0, User's Guide, IBM, (Jul. 27, 2017), date retrieved from google.

(Continued)

*Primary Examiner* — Hosain T Alam
*Assistant Examiner* — Nicholas E Allen
(74) *Attorney, Agent, or Firm* — Vista IP Law Group, LLP

(57) ABSTRACT

Disclosed is a system, method, and computer program product that generates masked data from within a database infrastructure. Instead of requiring an external tool to generate masked data, a database generates masked data using its internal processing mechanisms.

24 Claims, 17 Drawing Sheets

(56) References Cited

U.S. PATENT DOCUMENTS

2017/0351716 A1* 12/2017 Higginson ............ G06F 16/214
2020/0125667 A1    4/2020 Sonawane et al.

OTHER PUBLICATIONS

Pepper, C. et al., "Understanding and Selecting Data Masking Solutions: Creating Secure and Useful Data", Version 1.0, Securosis, (Aug. 10, 2012).

Net 2000, "Data Masking: What You Need to Know What You Really Need to Know Before You Begin", A Net 2000 Ltd. White Paper, (Dec. 12, 2010), date retrieved from google.

Informatica, "Best Practices for Dynamic Data Masking: Securing Production Applications and Databases in Real-Time", White Paper, Informatica, (Oct. 2011).

Oracle, "Oracle Data Masking and Subsetting: Frequently Asked Questions (FAQ)", Oracle, Sep. 2016.

Preethy P G et al., "Data Masking and Subsetting Guide Enterprise Manager 13c", Oracle, (Dec. 2015).

Non-Final Office Action for U.S. Appl. No. 17/444,047 dated Sep. 27, 2023.

Final Office Action for U.S. Appl. No. 17/447,047 dated Mar. 14, 2024.

* cited by examiner

REAL-TIME MASKING IN A STANDBY DATABASE

BACKGROUND

It is often desirable to perform data masking upon a set of data before making that data available to others. This situation may occur if various types of information in the original data set (such as user names, social security numbers, credit card information, home addresses, passwords, or other personal information) is deemed sensitive enough such that it needs to be masked before it is sent to a downstream consumer of that data.

For example, consider the scenario where an organization seeks to implement a new software application that will run against that organization's database. Before the new software application can be implemented in a production capacity, it will need to be tested to make sure that the software application will function as intended. The best way to perform testing is to run the functionality of the software application against the actual production data to make sure it will function correctly when applied to its intended set of operating data. However, it may not be appropriate to allow the pre-production software application to access the production database since the testing may be run or accessed by personnel that is not authorized to have access to sensitive data within the production database (e.g., where outside software vendors have access to and/or runs the pre-production software application). To avoid this problem, the software application can be run against fake, non-production data. However, the results from running against the non-production data may not provide an accurate-enough assessment of whether the application will function properly in a production environment.

Masking can be applied in this scenario to generate a sanitized version of the production database for testing purposes. The sensitive data can be either removed or changed in the sanitized dataset, e.g., by changing all such sensitive data to "***" symbols. In this way, the functionality of the software application can be fully tested to see if it will operate correctly against the actual production data. For example, load testing is one type of testing that can now be fully explored since the testing can be run against the sanitized version of the actual production data Conventionally, the masking procedure is performed by using an external tool outside of the database that generates the masked data. With this conventional approach, the production database is shut down or placed in a holding state to generate an export dump of the production data as of a given point in time. That export dump is then processed by the masking tool to remove the sensitive data, which is then rebuilt into a new database that can be tested against with a downstream software application.

However, there are numerous drawbacks and inefficiencies with this approach. One significant problem is that the masked data will very quickly become out-of-date, as continual changes occur to the production data. Therefore, in order to provide the latest version of the masked database, the above-described process would need to be performed very frequently. This is a very computationally expensive requirement, since every masking iteration will likely need to process the entire dataset to make sure all sensitive information is removed before being made available to others. If the iteration period is made less frequent to reduce these computation costs, then the testing may occur against out-of-date data that not correctly representative of the production database, which may lead to inaccurate or incomplete testing results. Even if the update costs are acceptable and the iteration periods are made more frequent, the masked data will nonetheless always be playing catch-up since any changes at all to the production database will immediately cause the masked database to be outdated. Another drawback with the above-described masking procedure is that it requires a change to the normal behavior of the production database, e.g., to generate the periodic export dumps. This change in behavior is undesirable since it increases reduces the ability of the database system to process normal workloads and/or increases system latency.

What is needed, therefore, is a method and/or system that overcomes these problems, and which more efficiently implements masking for a database system.

SUMMARY

According to some embodiments, a system, method, and computer program product is provided that generates masked data from within a database infrastructure. Instead of requiring an external tool to generate masked data, a database generates masked data using its internal processing mechanisms.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

According to some embodiments, a system, method, and computer program product is provided that generates masked data from within a database infrastructure. In some embodiments, this is accomplished by using a disaster recovery infrastructure of a database system to generate masked data, where mechanisms that ordinarily generate a standby database from a primary database is instead used to generate a masked database. In this way, rather than requiring an external tool to generate masked data, a database can generate masked data using its internal processing mechanisms.

Figure 1:
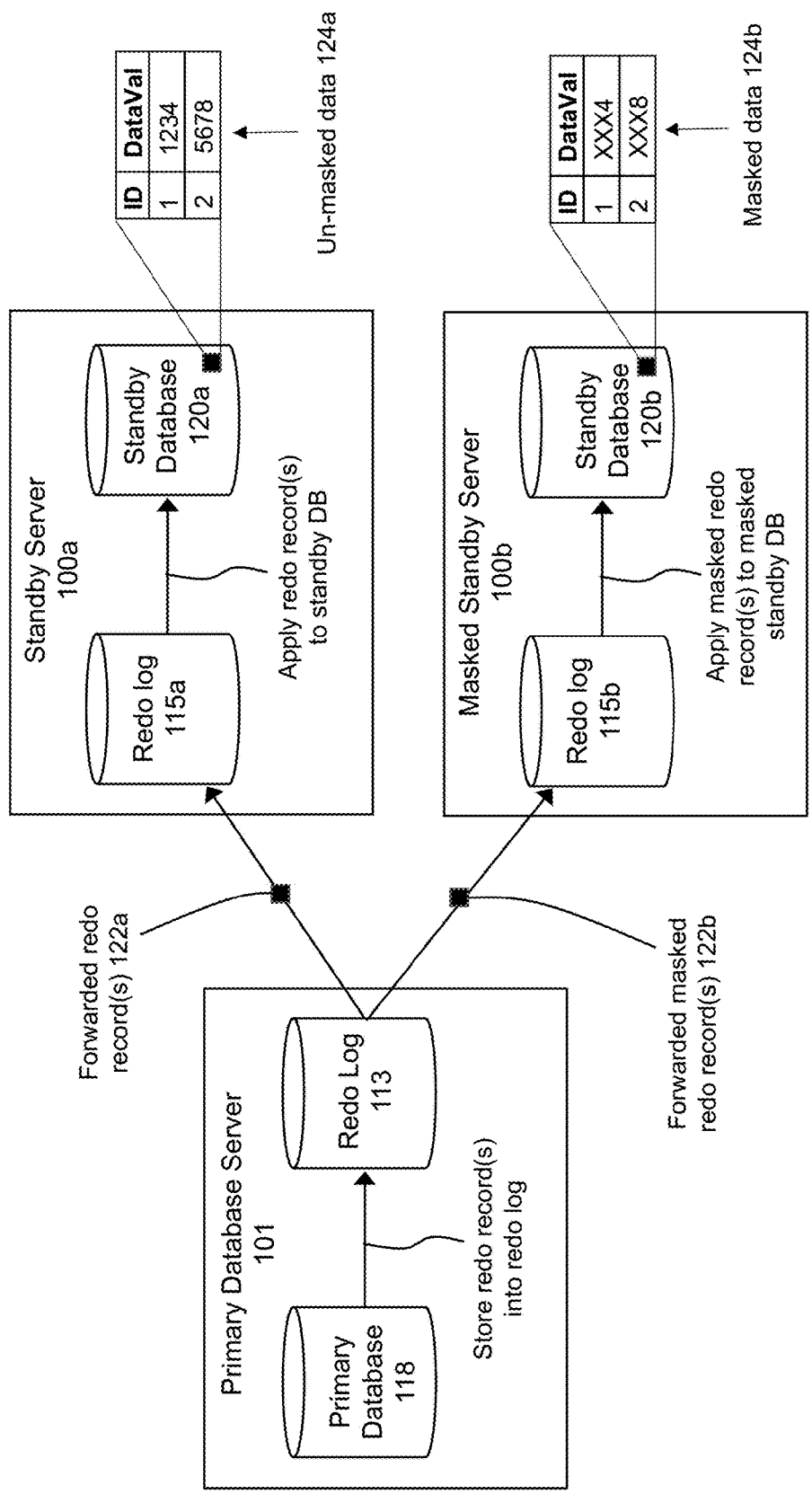
FIG. 1 illustrates a system for implementing some embodiments of the invention.

FIG. 1 illustrates a system 100 for implementing the invention according to some embodiments. For illustrative purposes, this figure shows a database system that includes a primary database server 101 on which a primary database 118 resides. The system also includes a mechanism to generate a standby database 120a on a standby database server 100a. A standby database is a replica of a primary database, where the standby database may be created to protect against disasters or data corruption that occur to the primary database, and/or to allow for supplemental reporting that occurs at the standby. For example, if a primary database is destroyed or if data stored in the primary database is corrupted, a failover may be performed such that a standby database becomes the new primary database. As another example, many reporting applications execute on standby databases to offload computer processing from the primary since the data between the standby and the primary are generally synchronized. Some of these reporting applications require the data on the standby to be as close to or as near identical to the primary as possible.

A standby database can be maintained by applying redo records from the primary database to the standby database. Redo records describe changes to data stored in a database, and are generated when these changes are made in the primary database. For example, if one or more rows of data in a table stored in the primary database are updated, then redo records are generated that describe how those rows changed in the table.

For purposes of disaster recovery or report offloading, redo records can be used to allow any changes that occur at a primary database to be replicated to a standby database. As illustrated in FIG. 1, the primary database 118 may generate redo records that are stored in a redo log 113 at the primary database server. For disaster recovery purposes, at the standby server 100a, the received copies of the redo records 122a are placed into a redo log 115a. The redo records are used to reconstruct changes made to the contents of the primary database which are applied to the standby database 120a to maintain the standby in synchronization with the primary. In some embodiments (e.g., for "physical replication"), the redo records correspond to changes made to the contents of a database on a block-by-block basis, and thus, application of the redo records at the standby database creates physical copies of data blocks from the primary database. This means that when redo records are generated in response to logged changes made to the contents of a primary database, these records are sent to a standby database where the same changes are made to ensure that the contents of the standby database remain identical to those of the primary database. In this way, if a disaster occurs at the primary, then a "failover" operation can be implemented to allow the system to continue handling work from the standby system.

In some embodiments of the invention, the approach of applying redo records from a primary to create a standby can also be used to generate a masked database. Instead of using standard redo records 122a from the primary, a masked standby server 110b receives masked redo records 122b that are placed into redo log 115b. The masked redo records 122b replaces some or all of the original data content with masked data content. Therefore, when the masked redo records 122b are applied to the masked standby database 120b, this results in a set of data that is masked to obscure out some or all of the original data content.

As shown in masked data 124b, "XXX" content has been used to mask out some of the original data in the second column of the data table in the masked standby database 120b. This is in contrast to un-masked data 124a which shows the same table in the standard un-masked standby database 120a, where the columns in the table do not include the masking content.

Figure 2:
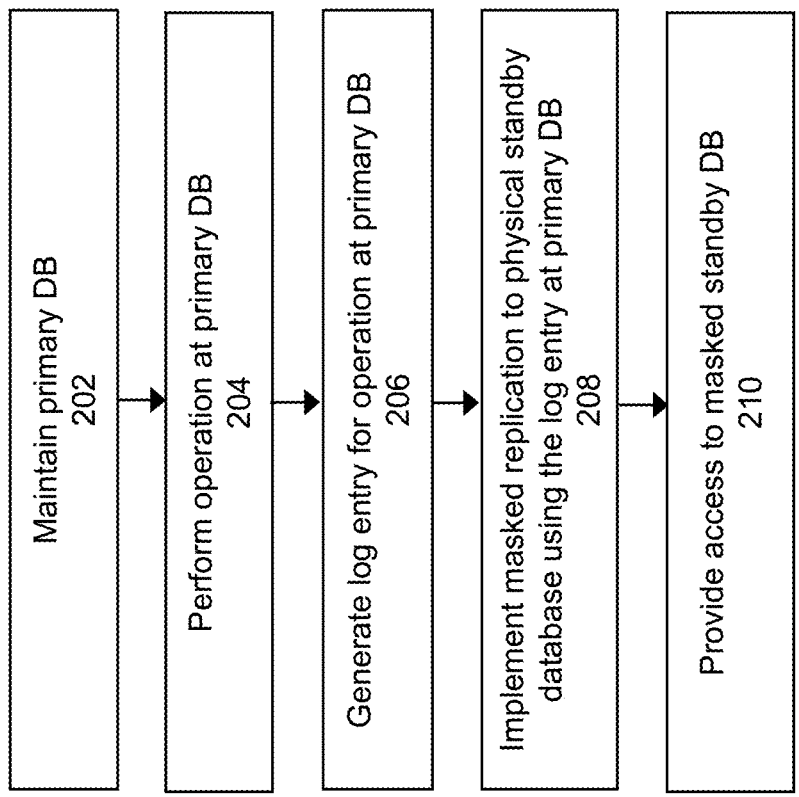
FIG. 2 shows a flowchart of an approach to implement some embodiments of the invention.

FIG. 2 shows a flowchart of an approach to implement some embodiments of the invention. At 202, a primary database is maintained, where the primary database includes one or more database tables.

At 204, an operation is performed at the primary database, e.g., to apply one or more changes to a table in the primary database. The database tables may be operated upon by one or more clients within the system, where users at the clients operate a user station to issue SQL commands to be processed by the database upon the table. The user stations and/or the servers that host the database comprises any type of computing device that may be used to implement, operate, or interface with the database system. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs.

Database applications interact with a database server by submitting commands that cause the database server to perform operations on data stored in a database. For the database server to process the commands, the commands typically conform to a database language supported by the database server. An example of a commonly used database language supported by many database servers is known as the Structured Query Language (SQL). When a database server receives the original statement of a database command from a database application, the database server must first determine which actions should be performed in response to the database command, and then perform those actions. The act of preparing for performance of those actions is generally referred to as "compiling" the database command, while performing those actions is generally referred to as "executing" the database command. A database "transaction" corresponds to a unit of activity performed at the database that may include any number of different statements or commands for execution.

At 206, a log entry is generated for the operation that was performed at the primary database. Logging (e.g., redo logging) is performed to record all modifications performed on the database before they are applied. One reason to implement logging is to ensure ACID (Atomicity, Consistency, Isolation, Durability) properties in the database system guarantee that database transactions are processed reliably. Atomicity requires that each transaction is all or nothing; if any part of the transaction fails, then the database state should not be changed by the transaction. Consistency requires that a database remains in a consistent state before and after a transaction. Isolation requires that other operations cannot see the database in an intermediate state caused by the processing of a current transaction that has not yet committed. Durability requires that, once a transaction is committed, the transaction will persist.

In some embodiments, write-ahead logging is used to record all modifications performed on the database before they are applied. No changes are made to the database before the modifications are recorded. Furthermore, no transaction is acknowledged as committed until all the modifications generated by the transaction or depended on by the transaction are recorded. In this manner, write-ahead logging ensures atomicity and durability.

The modifications are recorded as change records, which correspond to redo records in many database systems. The change records are generated in-memory by a process executing a transaction, and are copied into one or more in-memory change log buffers. Multiple processes executing transactions may concurrently generate the change records into corresponding change log buffers. One or more writer processes gather the change records from the in-memory change log buffers and write them out to a persistent change log file on disk. The change records are cleared from the in-memory change log buffers after they are persisted to disk. When a writer process gathers change records from a particular region of an in-memory change log buffer, it needs to wait for and synchronize with activity from any process that is writing into the same region. When a transaction commits, because write-ahead logging requires the change records to be persisted before applying the corresponding changes to the database, the writer process must write any remaining change records for the transaction from the corresponding in-memory change log buffer to the persistent change log file. A commit change record is also generated to indicate the end of the transaction.

As noted above, log records are maintained to allow suitable recovery operations in the event of a system failure or aborted transaction. Some common problems that could cause a system failure or aborted transaction include hardware failure, network failure, power failure, database instance failure, data access conflicts, user errors, and statement failures in the database access programs (most often written in the structured query language or SQL). Different types of transaction log records can be maintained in a database system. A common transaction logging strategy is to maintain redo records that log all changes made to the database. With "write ahead logging", each change to data is first recorded in the redo log, and only afterwards is that change actually made to the database block corresponding to the changed data. This protects against the situation when a system failure occurs and the version of the database data that is immediately restored from disk does not accurately reflect the most recent state of the database. This may occur because of changes to the data that has only occurred in cache, and have not been recorded to disk before the failure. If redo log have been properly maintained for these cache-only changes, then recovery can be performed by applying the redo records to roll the database forward until it is consistent with the state that existed just before the system failure. In a disaster recovery system, the redo records may also be used to synchronize a standby database with a primary database.

At 208, masked replication is implemented by applying redo records to a standby database system. As discussed in more detail below, masked replication is implemented by generating a masked version of the change records, and then applying those masked versions of the change records to the standby database system.

The masked versions of the standby database system includes data that has been changed in some way so that the data is not a faithful reproduction of the original data. For example, the masked data may include symbols (such as "XXX" or "*" symbols) which replace actual data within the database. At 210**, the masked standby database is made available to a downstream consumer of the data, e.g., to perform testing using a pre-production version of a software application or to perform load testing.

Figure 3:
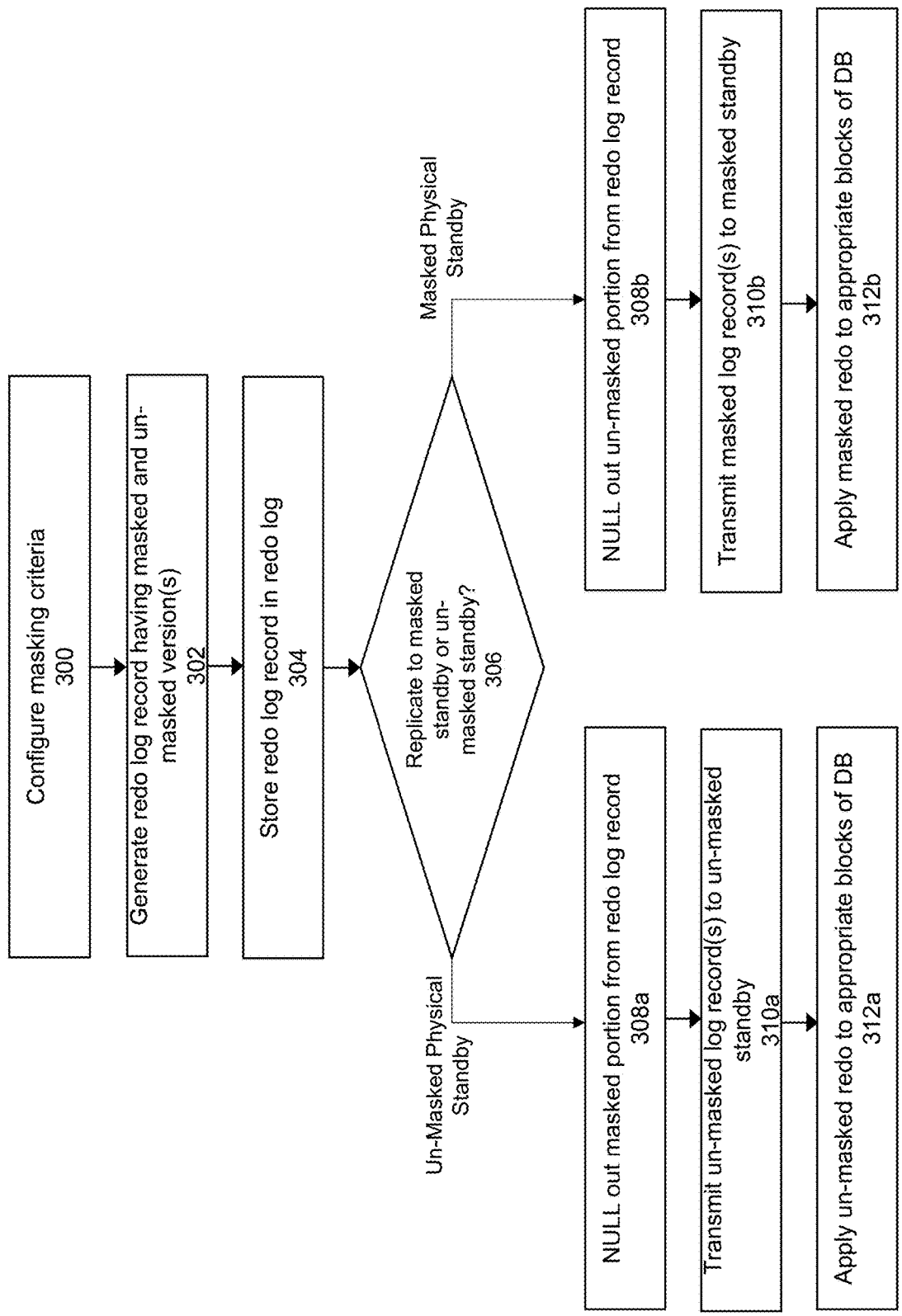
FIG. 3 shows a more detailed flowchart of an approach to implement masking according to some embodiments of the invention.

FIG. 3 shows a more detailed flowchart of an approach to implement masking according to some embodiments of the invention. At 300, a masking criteria is configured for a table of interest. The masking criteria identifies one or more columns within a table that are intended to be subject to masking. The masking criteria also describes the specific type of masking that is to be applied to a given column. For example, a regular expression may be configured to identify the masking to be applied to a column.

When a change occurs at the primary, a redo record is generated for that change at the primary database. At 302, a redo record is generated which includes both a masked version and an un-masked version of the change to be applied to data within the changed database table. This is accomplished, for example, by applying the masking criteria to the contents of a redo record to generate an updated redo record that is modified to include a version of the redo that includes the masked version of the change.

At 304, the redo record is stored into the redo log at the primary database. When replication occurs, a determination is made at step 306 whether the replication is directed to a masked standby or to an un-masked standby.

If the replication is directed to an un-masked standby, then at 308a, the masked portion of the redo record is obscured, removed, and/or otherwise marked to be ignored within the redo record. For example, the masked portion of the redo record can be NULL' ed out within the redo record. This creates an un-masked version of the redo record having the full set of data changes that occurred at the primary.

At 310a, the un-masked redo log record is then transmitted to the un-masked standby. At 312a, that un-masked redo is applied at the standby to generate an un-masked version of the data at the standby database.

If the replication is directed to a masked standby, then at 308b, the un-masked portion of the redo record is obscured and/or removed within the redo record. For example, the un-masked portion of the redo record can be NULL' ed out within the redo record. This creates a masked version of the redo record that does not include an accurate reproduction of the actual data from the primary.

At 310b, the masked redo log record is then transmitted to the masked standby. At 312b, that masked redo is applied at the standby to generate a masked version of the data at the standby database.

Figure 4A:
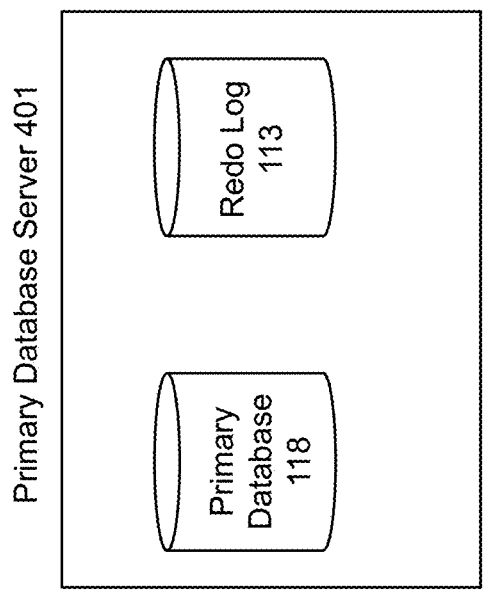
FIGS. 4A-4L provide an illustration of an approach to implement masking according to some embodiments of the invention.

FIGS. 4A-4L provide an illustration of an approach to implement masking according to some embodiments of the invention. FIG. 4A shows a primary database server 401 having a primary database 118 and a redo log 113. The primary database 118 may include one or more relational database tables. When changes are made to any of the tables within primary database 118, corresponding change records (e.g., redo records) are recorded for those changes in the reo log 113.

Figure 4B:
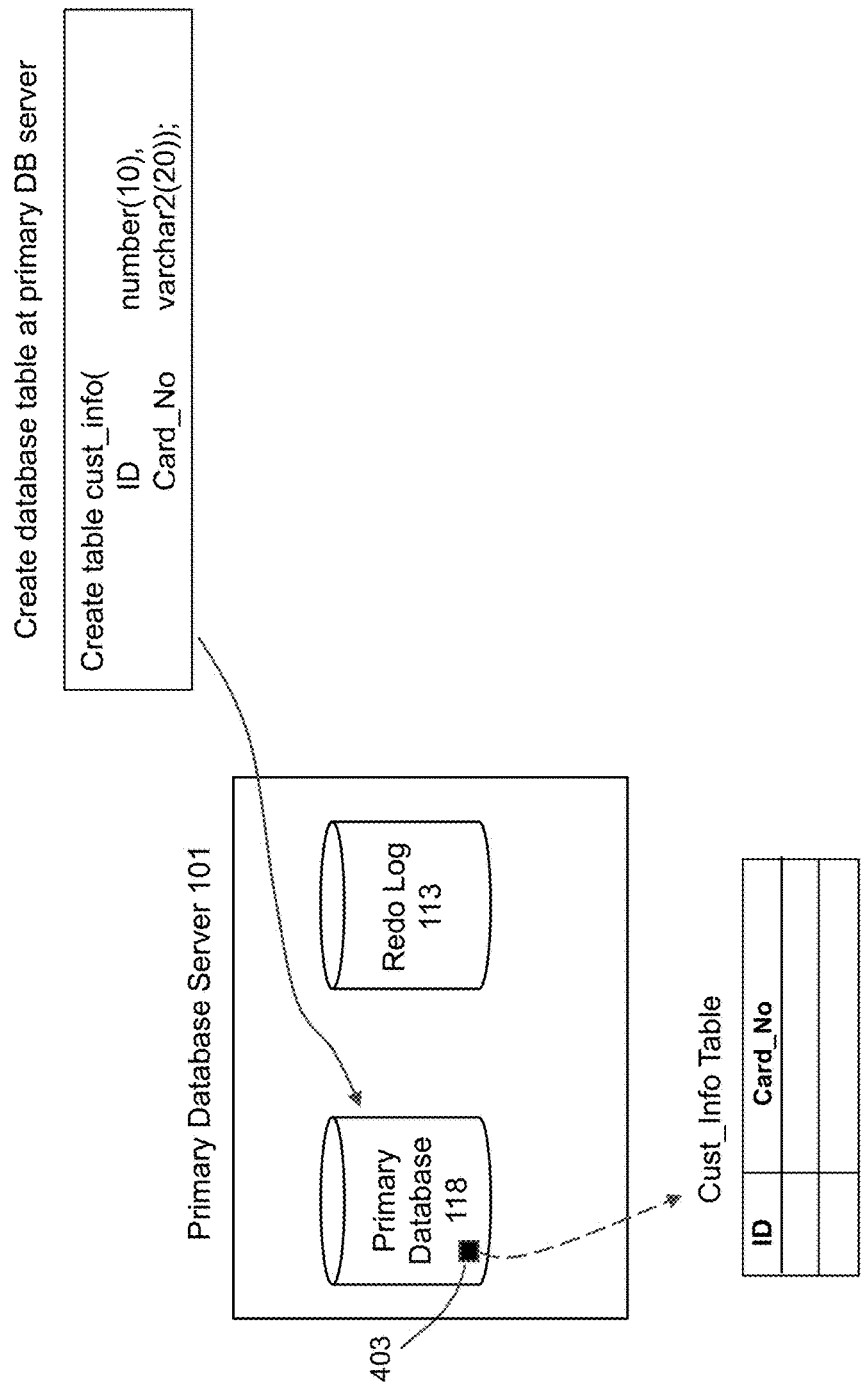

FIG. 4B illustrates the creation of an example table in the primary database 118. In particular, the example SQL statement creates a table 403 ("Cust_Info" table) that includes two columns, where a first column ("ID") holds number data types and a second column ("Card_No) holds varchar2 data types.

Figure 4C:
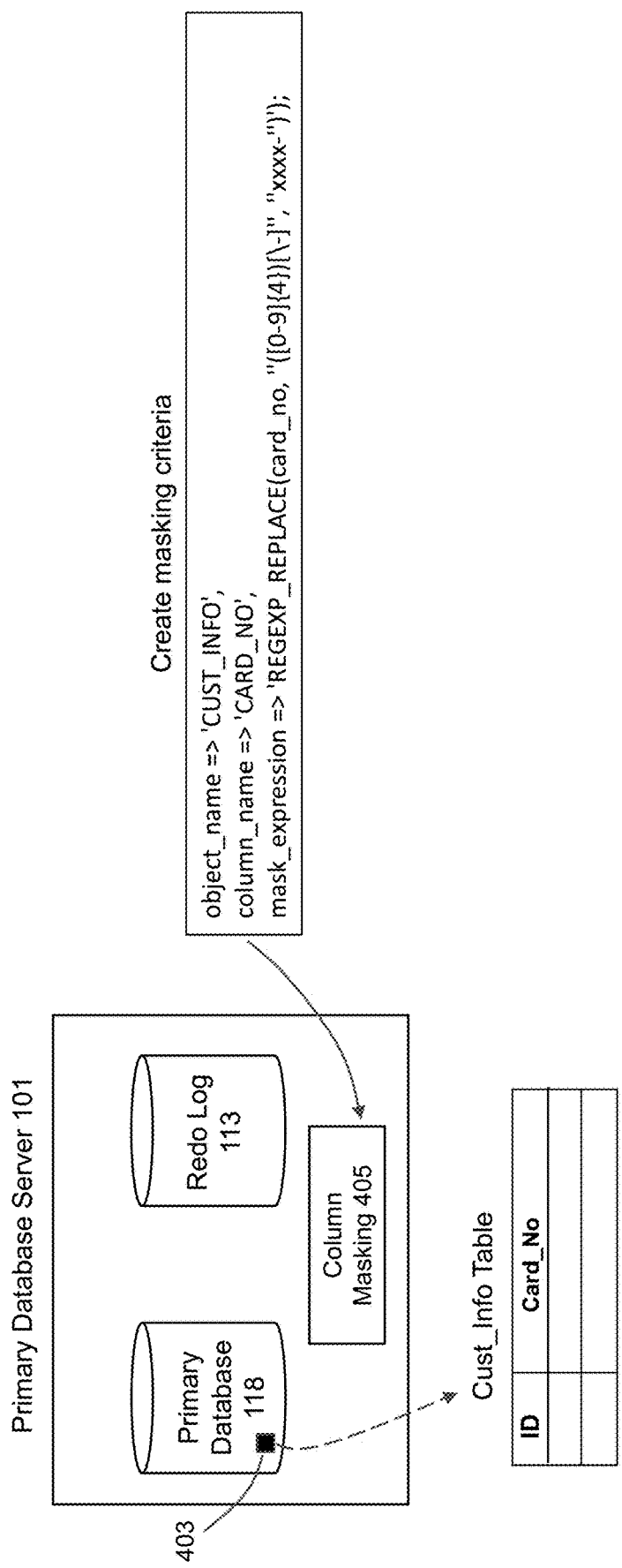

FIG. 4C illustrates a masking criteria 405 that is created for the table 403. Here, the masking criteria 405 identifies the specific database object that it is intended to be applied to, i.e., the "Cust_Info" table. The masking criteria may also identify which of the columns within an identified table will be subject to masking. In the current example, the masking criteria identifies column "Card_No" as the column to be masked, e.g., because this column includes a credit card number that is deemed sensitive/confidential enough such that it needs to be masked before being placed into a testing environment. The masking criteria may include the specific expression to be applied to implement the masking. In the current example masking criteria, a regular expression has been provided which replaces any sequence of four numbers followed by the "-" character within the column with the following character string: "xxxx-" (e.g., where the sequence "1285-" is replaced by "xxxx-"). If the value in the column is "1285-1458-3658-9848", then portions "1285-", "1458-", and "3658-" would each be replaced with "xxxx-". The portion containing "9848" would not be replaced since it does not end with the "-" character as required by the regular expression. This masking criteria therefore changes "1285-1458-3658-9848" into "xxxx-xxxx-xxxx-9848".

Figure 4D:
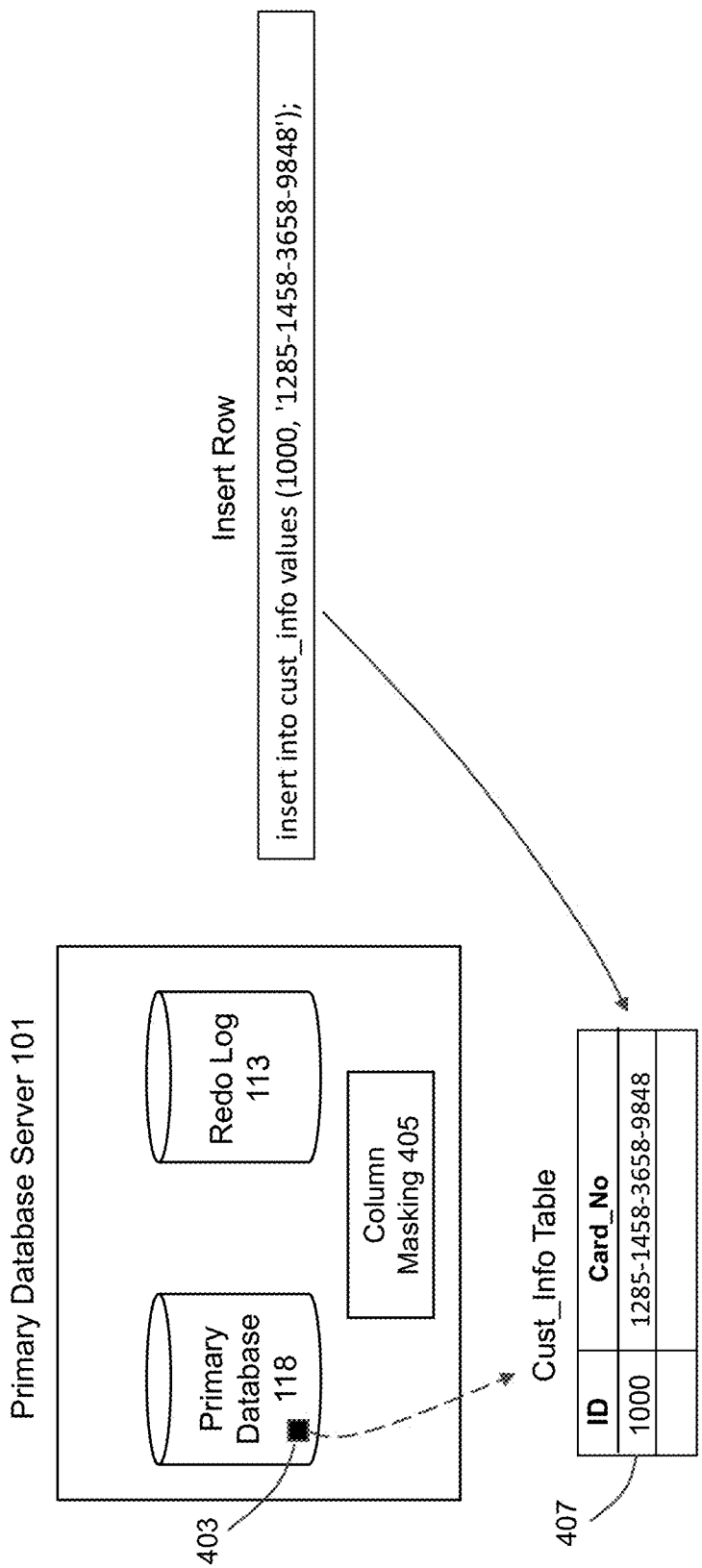

Assume that a row of data is inserted into the "Cust_Info" table 403. FIG. 4D shows an example SQL statement that can be used to insert a row of data into table. In particular, the example SQL statement inserts the value "1000" into the first column and inserts the characters "1285-1458-3658-9848" into the second column.

Figure 4E:
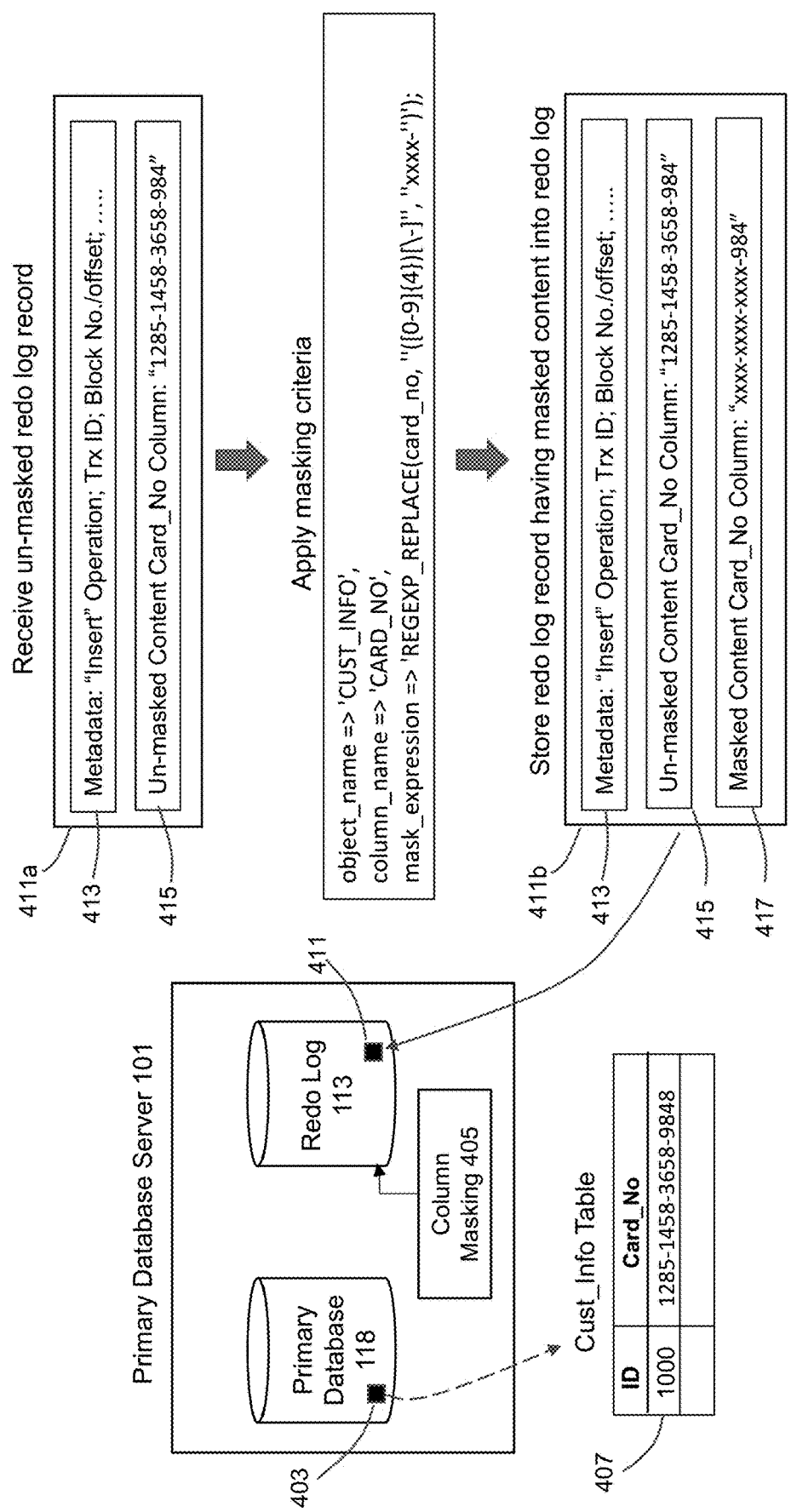

As shown in FIG. 4E, the redo record 411 corresponding to this insert operation will be placed into the redo log 113. The un-masked redo log record 411*a* includes a metadata portion 413 and the redo/change portion 415. The metadata portion 413 comprises various items of metadata that are pertinent to the log record, such as the type of operation performed by the change (e.g., an insert operation), the ID of the transaction that performs the operation, the specific block/offset of the data block affected by the operation, the time and/or SCN (system commit number) of the operation, etc. For physical replication, the redo/change portion 415 may include a copy of the change to the data block that is to be applied to replicate the changed data block at the standby.

The masking criteria is applied to the un-masked redo log record 411*a* to generate a revised version 411b that also includes a masked version 417 of the redo/change portion. Here, the figure shows that the masked version 417 of the redo/change portion shows a change from the original data "1285-1458-3658-9848" in the "Card_No" column for the insert operation to a masked version "xxxx-xxxx-xxxx-9848" of that data.

Figure 4F:
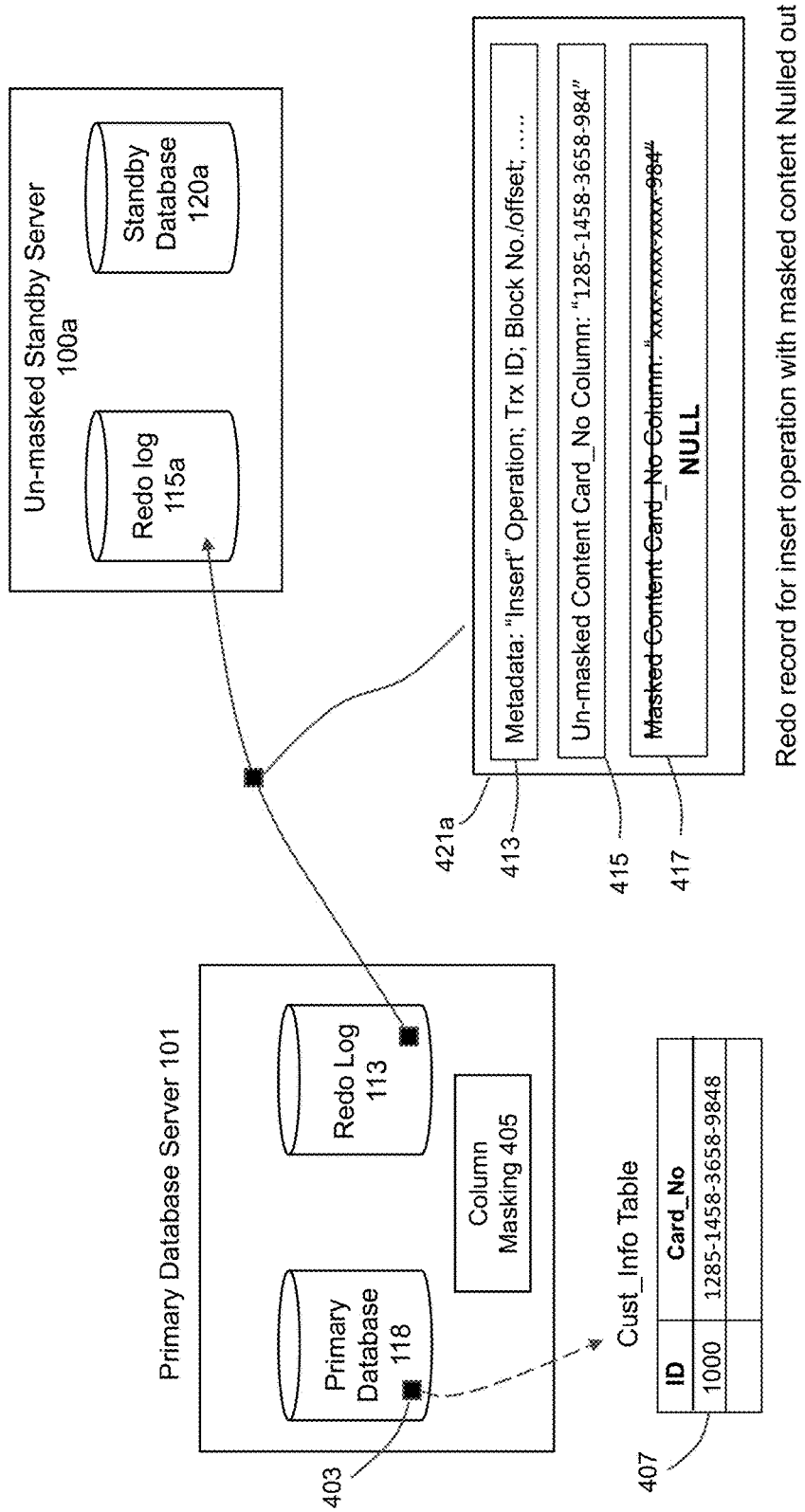

Assume that replication is to be performed to the un-masked standby, e.g., to update/create a standby that is a faithful replica of the primary for disaster recovery or reporting purposes. As shown in FIG. 4F, the redo record can be modified to generate a modified redo record 421*a* where the masked portion 417 is NULL'ed out. The modified redo record 421*a* is transmitted to the un-masked standby server 100*a* and stored into the redo log 115*a*.

Figure 4G:
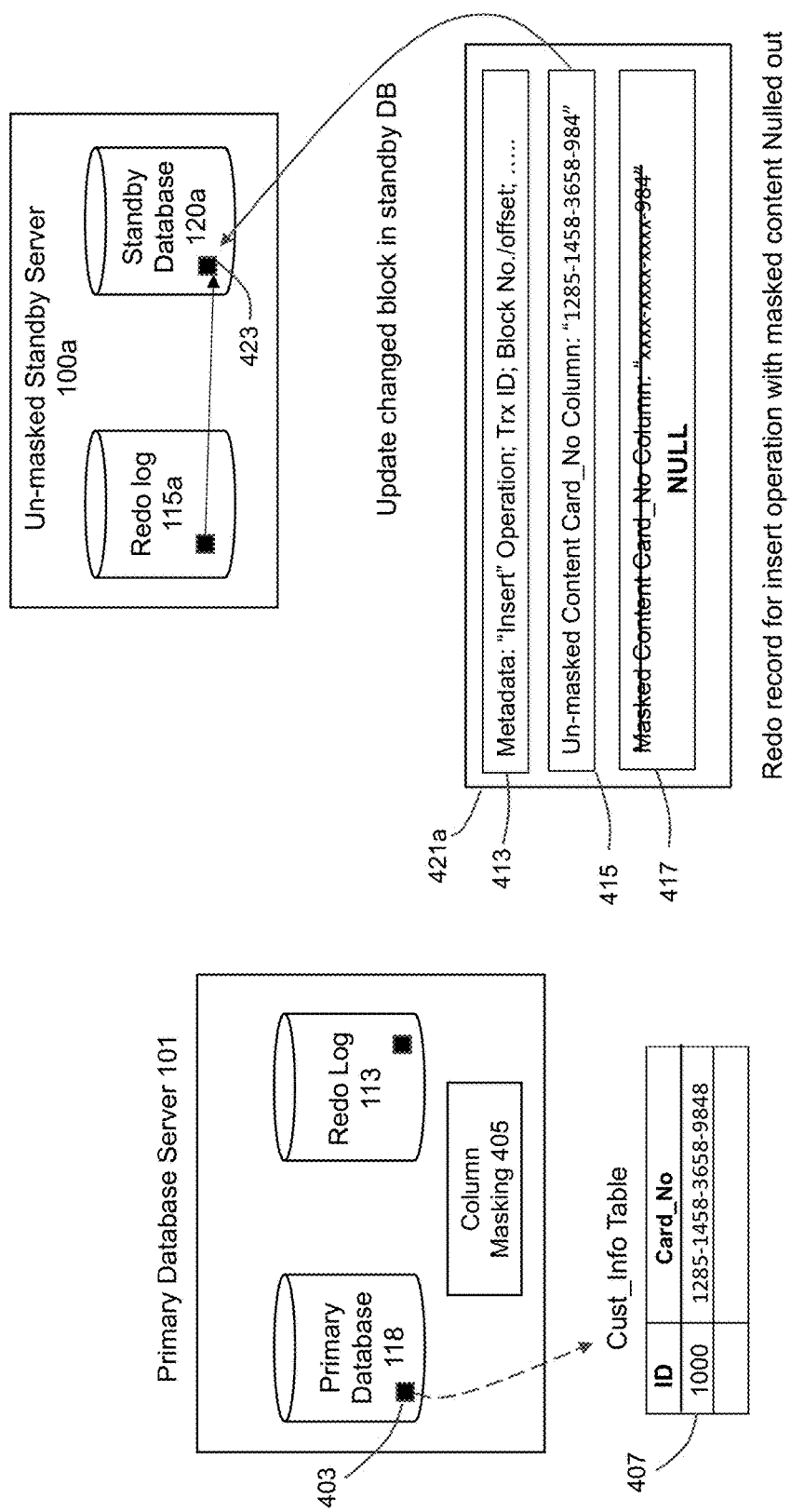
Figure 4H:
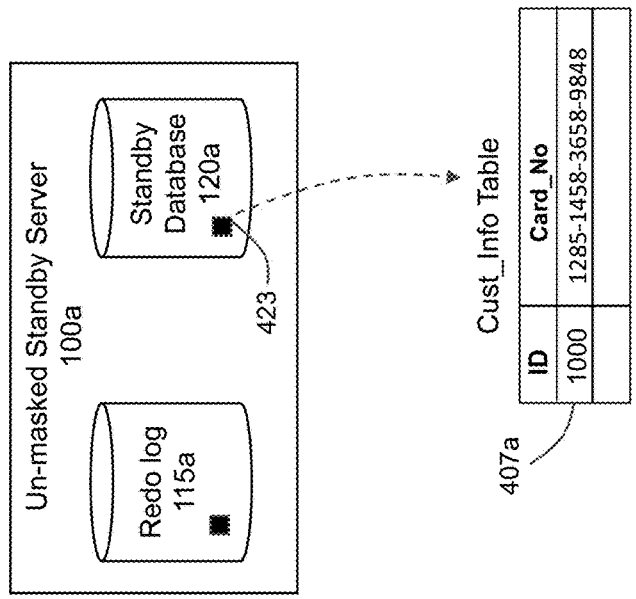
Figure 4H:
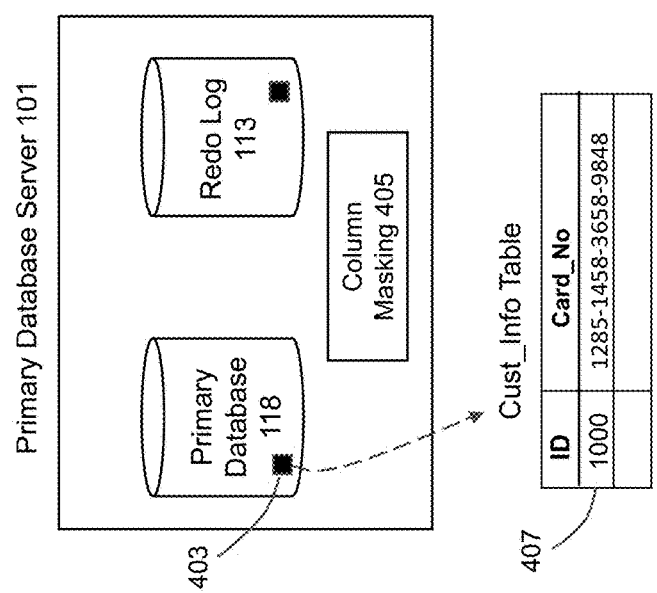

As shown in FIG. 4G, that redo record 421*a* is then applied to a database table 423 within standby database 120*a* to replicate the changes that were originally made to that same table 403 at the primary database 118. As illustrated in FIG. 4H, this results in an updated version of table 423 at the standby, where row 407*a* is inserted that is an exact copy of the original row 407 in the table 403 at the primary.

Figure 4I:
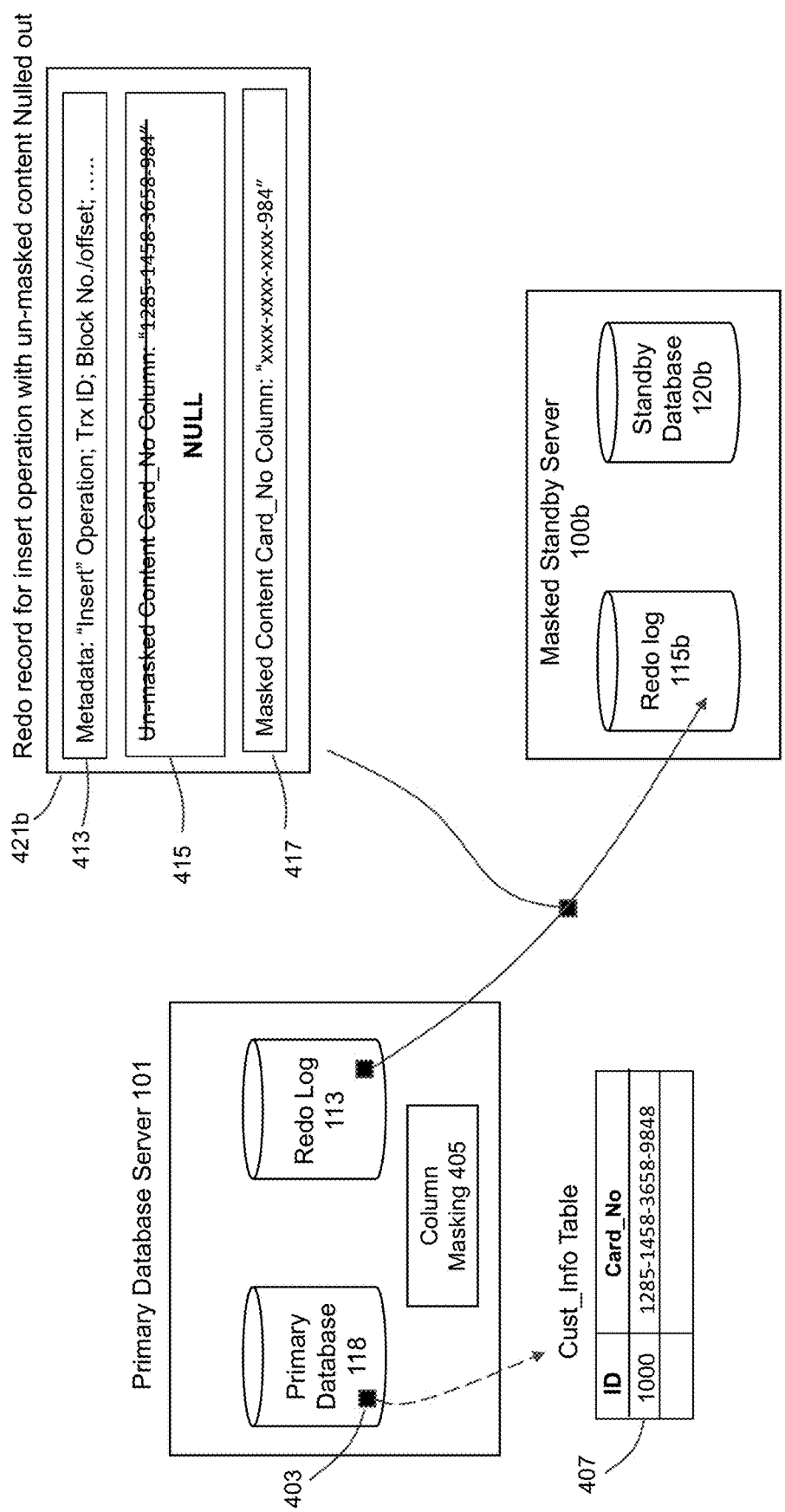

Now, assume that replication is to be performed to the masked standby, e.g., to update/create a standby that has masked out any sensitive data from the primary. As shown in FIG. 4I, the redo record can be modified to generate a modified redo record 421*b* where the un-masked portion 415 is NULL'ed out. This creates a redo record 421*b* that no longer includes any of the sensitive data from the original redo record. The modified redo record 421*b* is transmitted to the masked standby server 100*b* and stored into the redo log 115*b*.

Figure 4J:
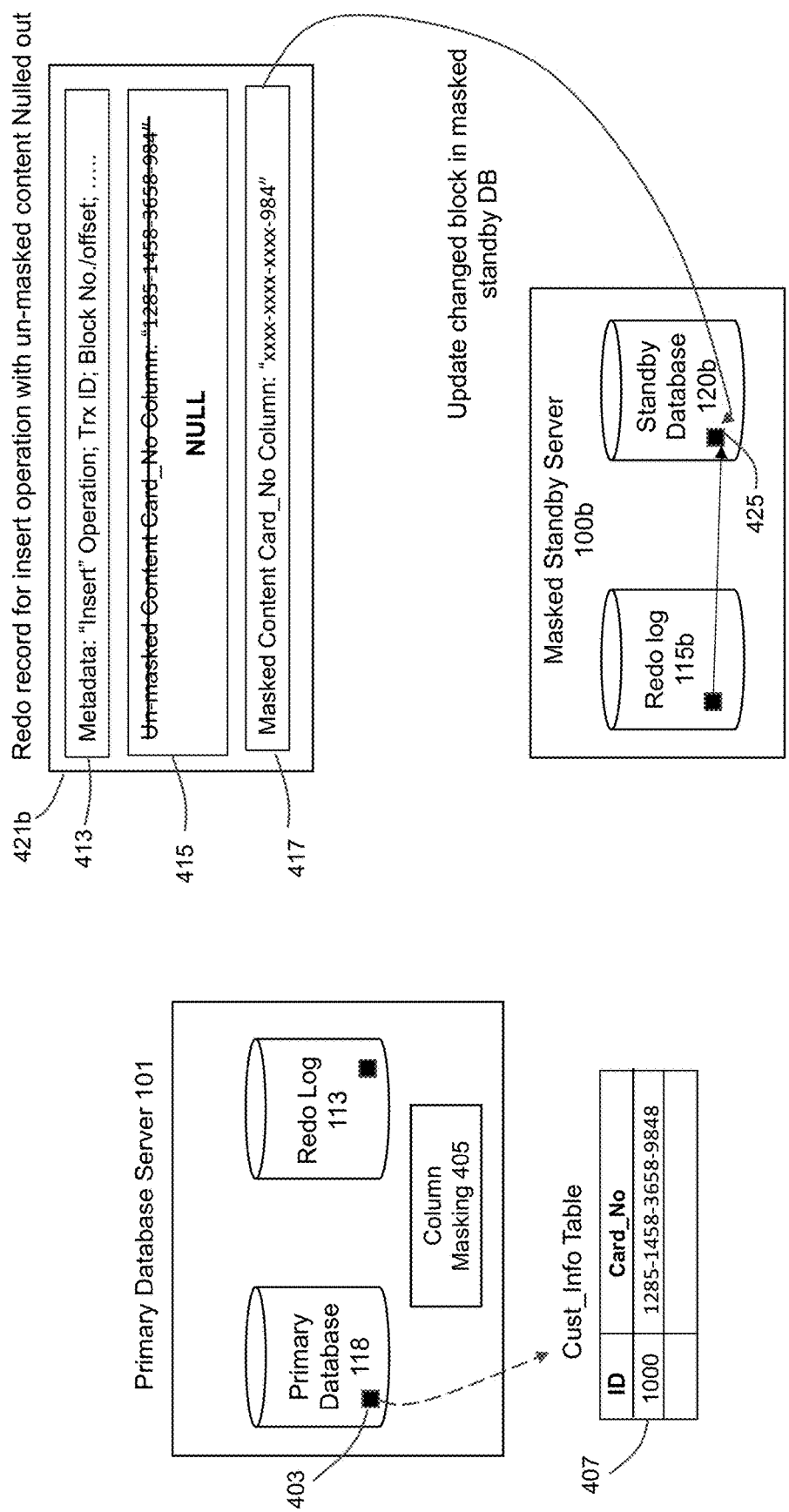

As shown in FIG. 4J, the redo record 421*b* is then applied to a database table 425 within masked standby database 120*b*. This replicates the changes that were originally made to that same table 403 at the primary database 118, but where masking is applied to relevant portions of the table.

Figure 4K:
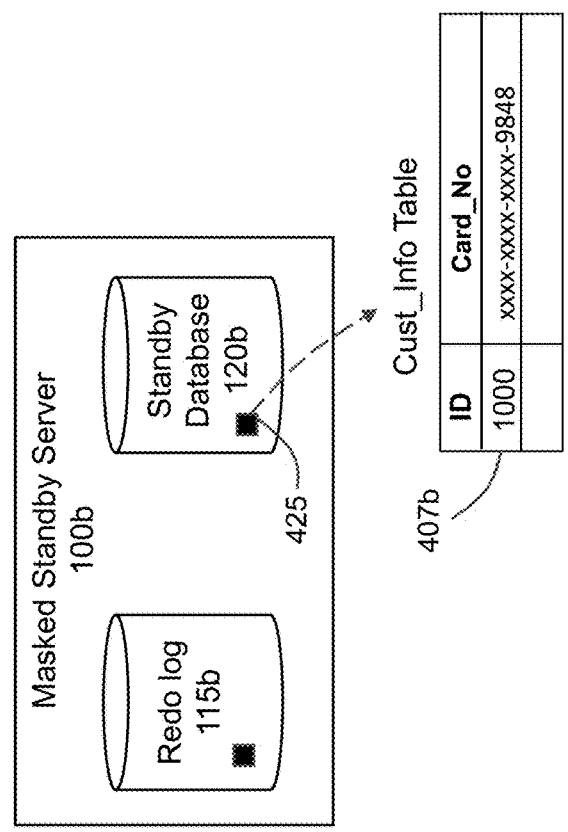
Figure 4K:
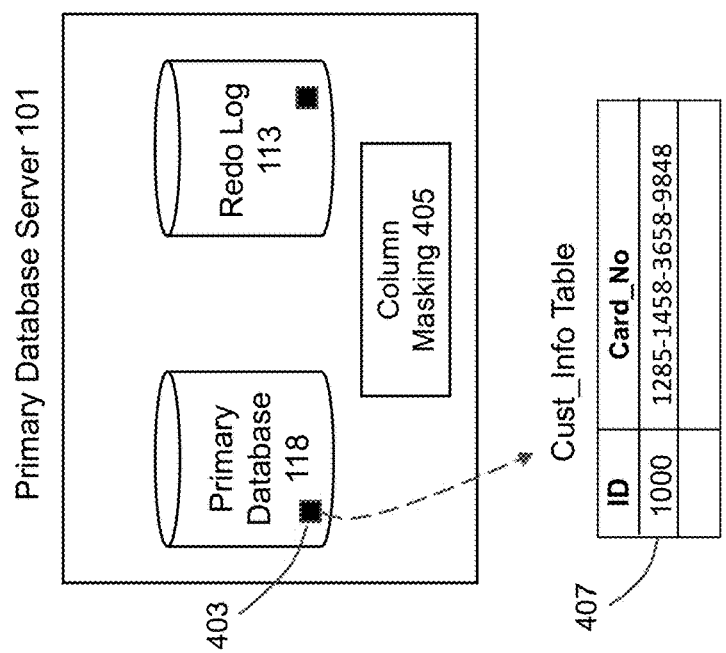

As illustrated in FIG. 4K, this results in an updated version of table 425 at the masked standby 120*b*, where row 407*b* is inserted into the table. The masked row 407*b* is not an exact copy of the original row 407 from table 403 at the primary. Instead, it can be seen that the contents of the "Card_No" column is changed such that many of the characters from the original data have been replaced with the "x" symbol.

Figure 4L:
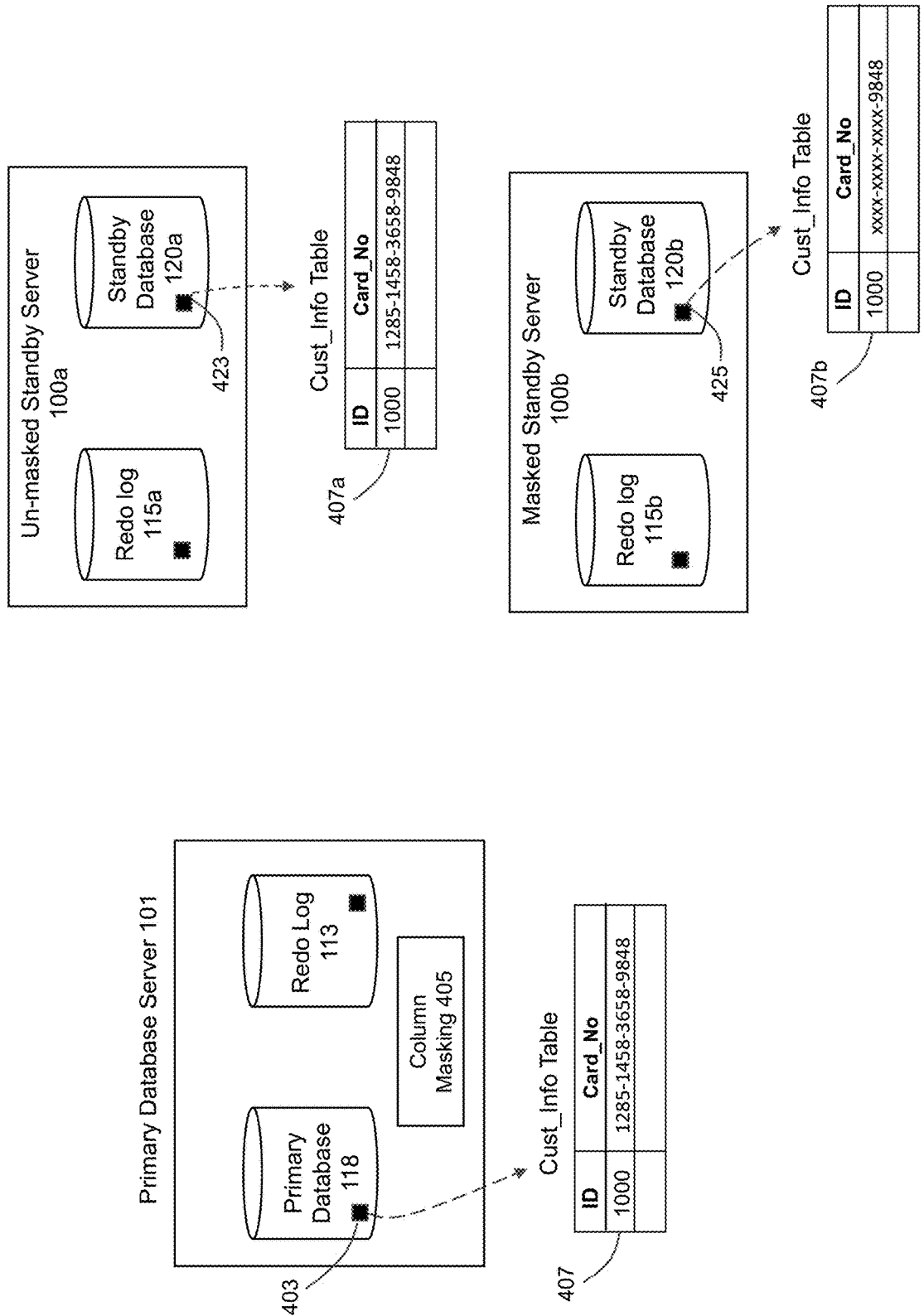

The final result is shown in FIG. 4L. This figure illustrates that disaster recovery mechanisms within the database system has been used to generate two different versions of a standby database. An un-masked standby is created that includes an accurate replica of the original contents of the primary. However, that same disaster recovery mechanism can also be used to create a masked version of the standby where an obscured/masked version of the contents of the primary have been copied to the masked standby.

Various alternative embodiments may be implemented for different aspects of the invention. For example, the above embodiment described an approach where a single redo record is generated at the primary that includes both the masked and unmasked versions of the redo record. In an alternate embodiment, instead of generating a single redo record, two separate redo records are generated where a first redo record include the masked content and the second includes the unmasked content. During replication, the appropriate version would be sent to standby that corresponds to that redo record, e.g., the masked redo is sent to the masked standby and the unmasked redo is sent to the unmasked standby.

The above-described embodiment pertains to physical replication of the contents of the primary to the standbys. In an alternate embodiment, logical replication may be implemented, where instead of changes sent on a block-basis to the standby, SQL-based changes are sent to the standbys. For the masked standby, the transmitted SQL from the primary to the standby will include a masking criteria embedded into the SQL, e.g., using a regular expression to modify column contents.

Some embodiments are applicable the starting/bootstrap stage of replicating an existing database for masking purposes to a masked standby. For the startup process, since the current state of the database may reflect content that pre-exist current ongoing redo records, this can be handled in a few possible ways. One approach is to take a historical copy of the redo records for that table, and to use the above-described mechanisms to generate masked historical redos that are sent to the standby and applied to create the masked standby. An alternative approach performs a copy of the existing table, the appropriate masking criteria is applied to generate an entire table that is a masked version that is copied to the standby.

Therefore, what has been described is an improved approach to generate masked data from within a database infrastructure, where the disaster recovery infrastructure of a database system is used to generate masked data. In this way, rather than requiring an external tool to generate masked data, a database can generate masked data using its internal processing mechanisms.

System Architecture Overview

Figure 5:
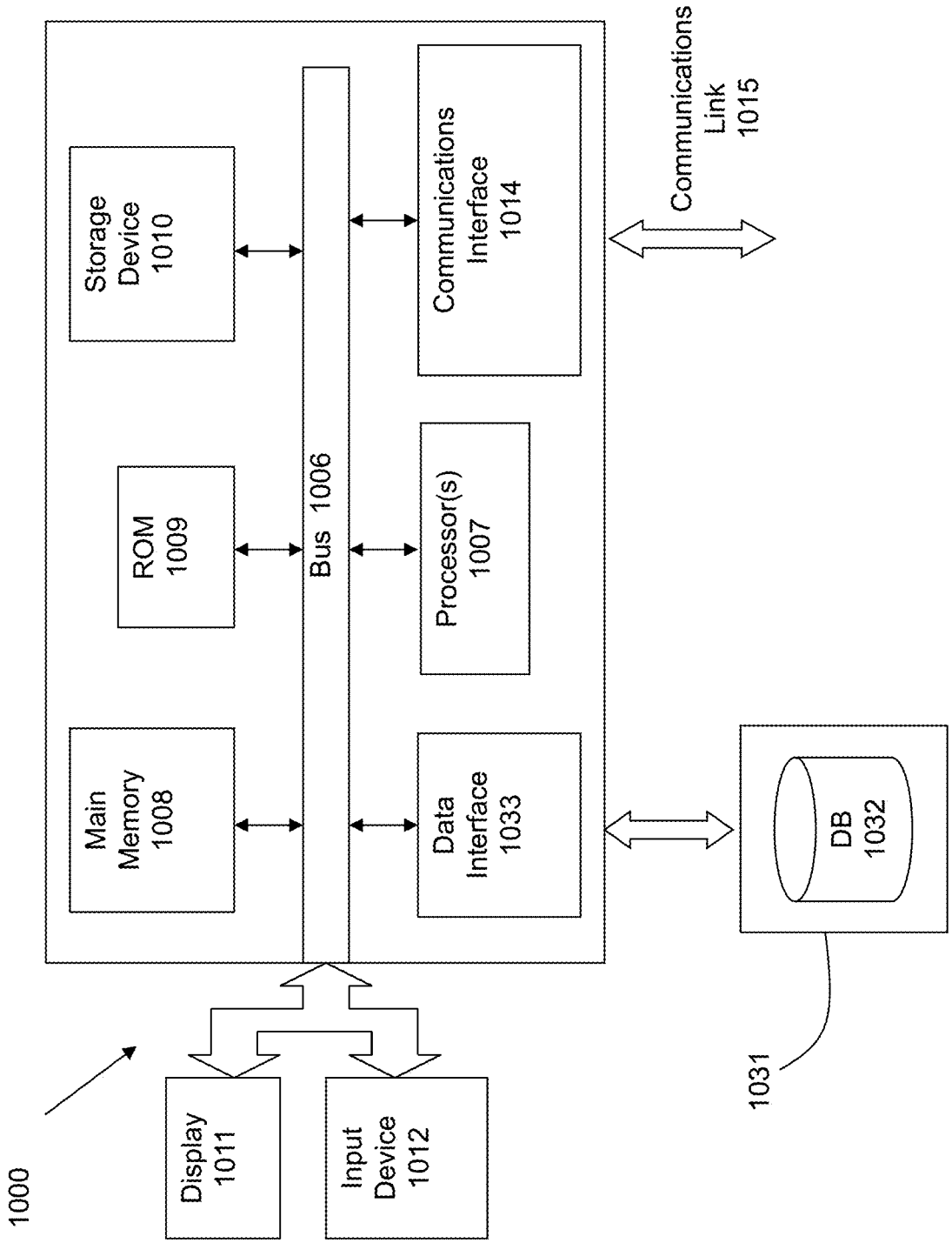
FIG. 5 is a block diagram of an illustrative computing system suitable for implementing an embodiment of the present invention.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 6:
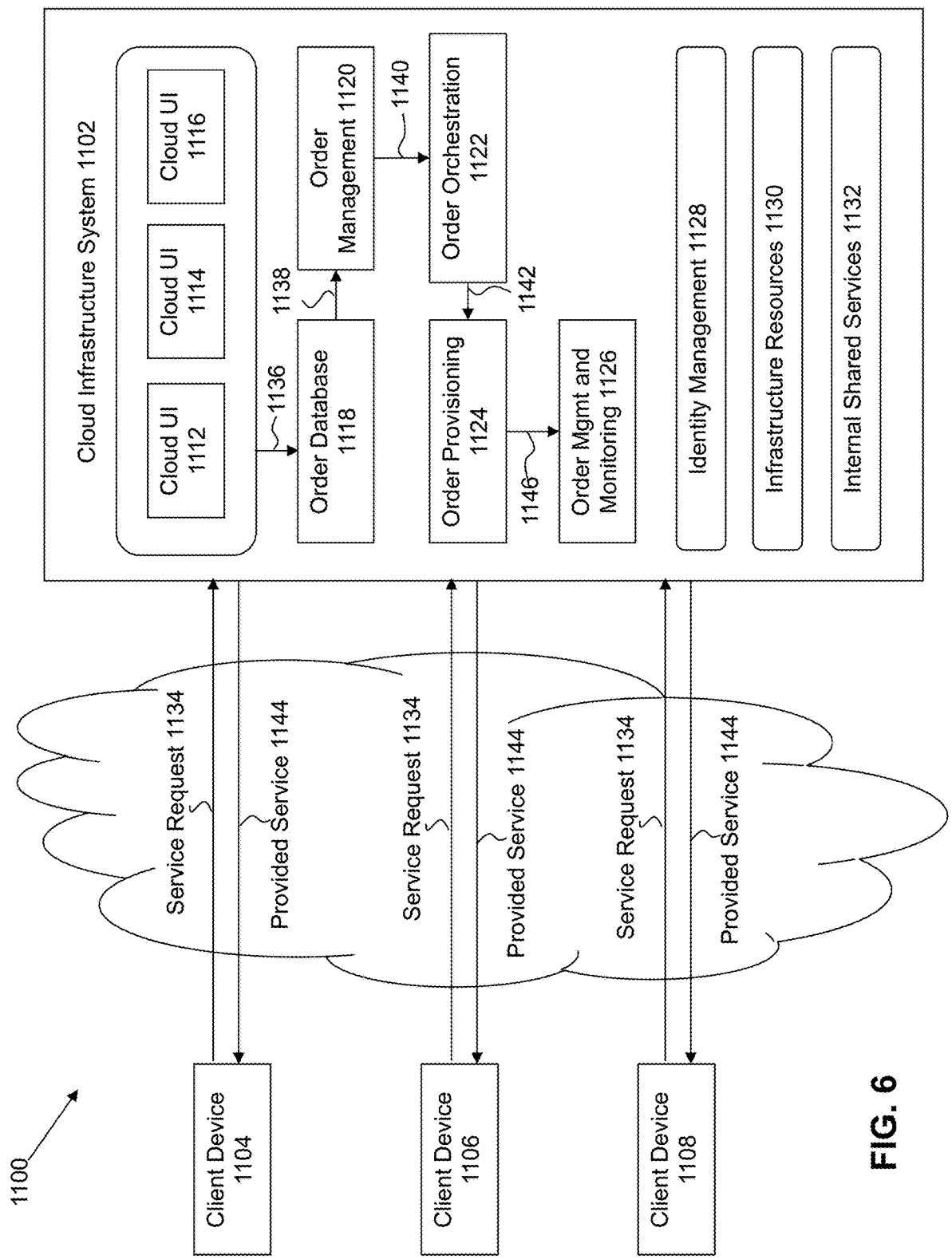
FIG. 6 is a block diagram of one or more components of a system environment in which services may be offered as cloud services, in accordance with an embodiment of the present invention.

FIG. 6 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 5. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method for implementing a masked database, comprising:
    identifying a change to a primary database comprising a relational database table, wherein the change modifies an entry in the relational database table;
    generating a redo record for the change, wherein the redo record comprises a masked version of the change to the primary database;
    copying the redo record to a standby database; and generating a masked version of the standby database at least by applying the masked version of the change in the redo record to the standby database.

2. The method of claim 1, wherein the redo record comprises both the masked portion and an un-masked portion.

3. The method of claim 1, wherein the redo record comprises two separate redo portions, where a first redo portion corresponds to a masked redo and a second redo portion corresponds to an unmasked redo.

4. The method of claim 1, wherein the redo record further comprises an un-masked portion, and the un-masked portion of the redo record is removed before the redo record is copied to the standby database.

5. The method of claim 1, wherein a masking criterion is applied to un-masked data for the change to generate the redo record having the masked portion.

6. The method of claim 5, wherein the masking criterion includes a masking expression that is directed to one or more columns of the relational database table, the masking expression corresponding to a regular expression.

7. The method of claim 1, wherein both an un-masked version of the standby database and the masked version of the standby database are maintained, the un-masked version of the standby database generated by applying one or more redo records having one or more corresponding un-masked versions of one or more changes, and the masked version of the standby database generated by applying the redo record having the masked version of the change in the redo record.

8. The method of claim 1, wherein physical replication is performed between the primary database and the standby database such that the redo record for the change is applied to the standby database on a block-by-block basis.

9. A system for implementing a masked database, comprising:
a processor; and
a memory for holding programmable code, wherein the programmable code includes instructions which, when executed by the processor, cause the processor to perform a set of acts that comprises:
identifying a change to a primary database, comprising a relational database table, wherein the change modifies an entry in the relational database table;
generating a redo record for the change, wherein the redo record comprises a masked version of the change to the primary database;
copying the redo record to a standby database; and
generating a masked version of the standby database at least by applying the masked version of the change in the redo record to the standby database.

10. The system of claim 9, wherein the redo record comprises both the masked portion and an un-masked portion.

11. The system of claim 9, wherein the redo record comprises two separate redo portions, where a first redo portion corresponds to a masked redo and a second redo portion corresponds to an unmasked redo.

12. The system of claim 9, wherein the redo record further comprises an un-mask portion, and the un-masked portion of the redo record is removed before the redo record is copied to the standby database.

13. The system of claim 9, wherein a masking criterion is applied to un-masked data for the change record to generate the redo record having the masked portion.

14. The system of claim 13, wherein the masking criterion includes a masking expression that is directed to one or more columns of the relational database table, the masking expression corresponding to a regular expression.

15. The system of claim 9, wherein both an un-masked version of the standby database and the masked version of the standby database are maintained, the un-masked version of the standby database generated by applying one or more redo records having one or more corresponding un-masked versions of one or more changes, and the masked version of the standby database generated by applying the redo record having the masked version of the change in the redo record.

16. The system of claim 9, wherein physical replication is performed between the primary database and the standby database such that the redo record for the change is applied to the standby data base on a block-by-block basis.

17. A computer program product embodied on a non-transitory computer readable medium, the non-transitory computer readable medium having stored thereon a sequence of instructions which, when executed by a processor, causes the processor to perform a set of acts for implementing a masked database, the set of acts comprising:
identifying a change to a primary database-comprising a relational database table, wherein the change modifies an entry in the relational database table;
generating a redo record for the change, wherein the redo record comprises a masked version of the change to the primary database;
copying the redo record to a standby database; and
generating a masked version of the standby database at least by applying the masked version of the change in the redo record to the standby database.

18. The computer program product of claim 17, wherein the redo record comprises both the masked portion and an un-masked portion.

19. The computer program product of claim 17, wherein the redo record comprises two separate redo portions, where a first redo portion corresponds to a masked redo and a second redo portion corresponds to an unmasked redo.

20. The computer program product of claim 17, wherein the redo record further comprises an un-masked portion, and the un-masked portion of the redo record is removed before the redo record is copied to the standby database.

21. The computer program product of claim 17, wherein a masking criterion is applied to un-masked data for the change to generate the redo record having the masked portion.

22. The computer program product of claim 21, wherein the masking criterion includes a masking expression that is directed to one or more columns of the relational database table, the masking expression corresponding to a regular expression.

23. The computer program product of claim 17, wherein both an un-masked version of the standby version of the database and the masked version of the standby database are maintained, the un-masked version of the standby database generated by applying one or more redo records having one or more corresponding un-masked versions of one or more change, and the masked version of the standby database generated by applying the redo record having the masked version of the change in the redo record.

24. The computer program product of claim 17, wherein physical replication is performed between the primary database and the standby database such that the redo record for the change is applied to the standby database on a block-by-block basis.

* * * * *

UNITED STATES PATENT AND TRADEMARK OFFICE
CERTIFICATE OF CORRECTION

PATENT NO. : 12,124,474 B2
APPLICATION NO. : 16/163171
DATED : October 22, 2024
INVENTOR(S) : Sonawane et al.

Page 1 of 1

It is certified that error appears in the above-identified patent and that said Letters Patent is hereby corrected as shown below:

In the Specification

In Column 7, Line 8, delete "reo" and insert -- redo --, therefor.

In Column 11, Line 25, delete "cloudservices" and insert -- cloud services --, therefor.

In Column 12, Line 31, delete "cloudservices" and insert -- cloud services --, therefor.

In the Claims

In Column 16, Line 22, in Claim 17, delete "database-comprising" and insert -- database comprising --, therefor.

Signed and Sealed this
Fourth Day of February, 2025

Coke Morgan Stewart
*Acting Director of the United States Patent and Trademark Office*